Patented Aug. 14, 1928.

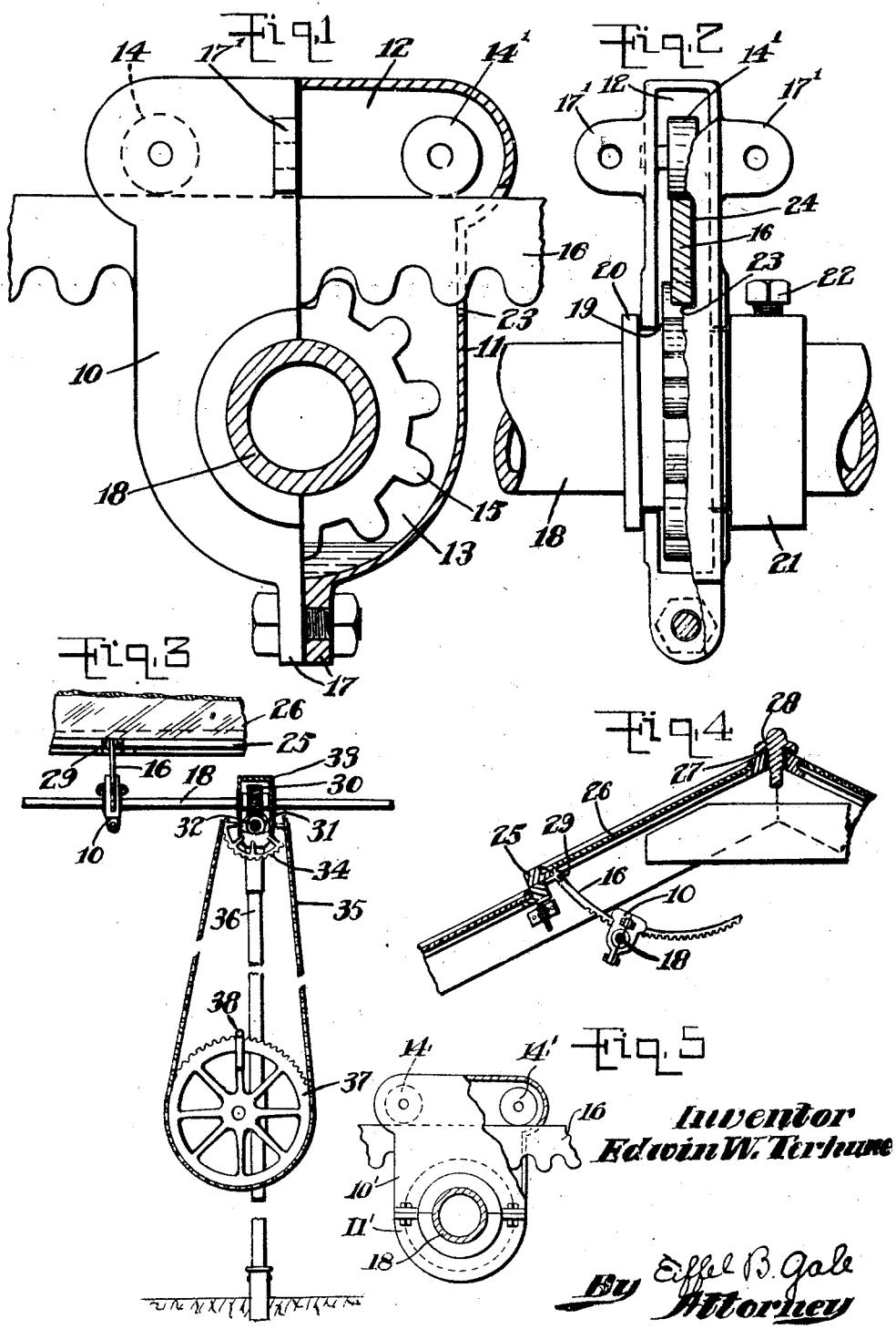

1,681,141

UNITED STATES PATENT OFFICE.

EDWIN W. TERHUNE, OF IRVINGTON ON HUDSON, NEW YORK, ASSIGNOR TO LORD & BURNHAM COMPANY, OF IRVINGTON ON HUDSON, NEW YORK.

SASH-OPERATING MECHANISM.

Application filed February 20, 1925. Serial No. 10,570.

This invention relates generally to sash operating mechanism for green houses or other structures and is particularly adapted for use in connection with that class of sash operating devices in which a rack bar and pinion are employed.

In the construction of green houses or other structures of relatively great length, say for example of one hundred feet and over, it becomes increasingly difficult to provide a sash operating mechanism for actuating and controlling movement of the sash throughout the entire length of the structure, from a single station or point of control. One means of obtaining this control is by the employment of a rack and pinion mechanism so arranged that a series of pinions are fixed at spaced intervals on a line shaft extending for the length of the structure, the rack bar being pivotally secured at one end to the window sash, while the teeth of the rack engage the pinion. The line shaft is in turn actuated by a worm and gear mechanism; a master gear, mounted upon the line shaft, engages a worm, and is actuated thereby. The worm may be actuated in any well known manner, such for example as by a chain and gear mechanism or a suitable arrangement of bevel gear, rod and hand wheel.

In the use of the rack bar and pinion it is necessary to provide a suitable means for holding and maintaining the rack bar in engagement with the pinion at all times throughout the entire range of movement of the rack when opening or closing the window sash. A means or device for accomplishing this result is sometimes called a rack and pinion cradle or set.

This matter of increase of friction is a serious one, particularly in dealing with structures requiring long runs of the line shaft.

It is desirable and important, therefore, to resort to such means as will reduce friction wherever possible.

One important feature contributing toward this end of reducing friction, is the provision of a suitable cradle or set which functions efficiently to maintain the rack and pinion at all times in such relative position as will reduce friction and minimize the possibility of obtaining a wedging action between the rack and pinion.

In addition to the provision of a suitable cradle in the first instance, it is also desirable to provide means for insuring proper lubrication. In connection with this latter feature, it may be noted that when in use, the rack and pinion is frequently placed at inaccessible points, so that, unless suitable provision for lubrication is made in the first instance, these parts frequently fail to receive proper lubrication in use; this of course results in increased friction causing unnecessary strain upon the parts and a needless waste of power to operated. It is therefore desirable to provide in the first instance a construction which will afford proper lubrication for a comparatively long period of time.

In apparatus intended for use in green houses, it is desirable and necessary to have the parts as neat, small and compact as possible, first in order to cut down and minimize the shadow effect, and second to afford a pleasing appearance.

One of the objects of the present invention is to provide in sash operating mechanism employing a rack and pinion, a cradle or set intended to overcome the difficulties and objections above noted, and which embodies the desirable features heretofore mentioned.

Other objects and advantages will be apparent from the following description and drawings in which one preferred embodiment of the invention is shown and described for purposes of illustration.

In the accompanying drawings,

Figure 1 is an elevation, broken away and partly in section, showing the cradle holding the rack and pinion in proper relative position.

Figure 2 is a side elevation of Figure 1, also broken away and partly in section.

Figure 3 is a fragmentary view showing the position of the cradle relative to the line shaft and the actuating mechanism.

Figure 4 is a fragmentary view showing more clearly the relative arrangement of the line shaft, rack, cradle and sash.

Figure 5 is a modified form in which the two part casing is formed by a line of division in a different plane.

As shown in Figure 1 the cradle comprises a casing of two parts 10, 11, formed by splitting the assembled casing in a vertical plane passing through the axis of the line shaft 18, on which the pinion 15, is fixed. Apertures 23, 23 are provided in opposite ends of the casing through which the rack bar 16 passes.

As shown in Figure 2, the side faces 24 of the aperture are close to the sides of the rack bar and serve as a guide to limit lateral movement of the rack 16 relative to the pinion 15; this guide also serves to prevent a wedging action of the rack with the pinion by maintaining the rack bar normal to the axis of the pinion at all times. This wedging action has been a source of some difficulty in certain devices heretofore employed in the art. The rack bar is thus guided in such a manner as to function effectively in operation with the pinion.

It is necessary to provide means for preventing disengagement of the rack bar 16 and the pinion 15, as the pinion is turned to actuate the rack bar; the rack 16 in turn actuates the window sash 25, holding the glass 26 therein, which sash may be pivotally supported at a suitable point 27. One end of the rack is pivotally connected to the sash 25, as shown at 29, in Figure 4. Preferably the rack bar 16 is formed with a slight curve as shown in Figure 4, but it is understood that a straight rack may be employed if desired. The rack and cradle may be formed of cast metal or by stamping as desired. The two parts of the casing are better suited for castings, but it is understood that other methods of manufacture may be used if found desirable.

In order to prevent disengagement of the rack 16 from the pinion 15, a plurality of rollers 14, 14', are provided, arranged to engage the upper edge of the rack. These rollers are supported and completely housed in an upper chamber or pocket 12 of the casing. The rollers are rotatably supported between the sides of the casing in any suitable manner as for example by bearing pins passing therethrough. The rollers are thus completely encased and protected.

As before stated, the casing is formed in two sections 10, 11; the line of division is in a vertical plane passing through the line shaft axis, so as to facilitate the mounting and assembly of the casing about the pinion after the line shafting and pinion have been erected. This is a particularly desirable feature in an enclosed casing of this type. Heretofore, so far as I know, no provision has ever been made for a substantially completely enclosed two part cradle casing, for housing the pinion, rollers and a portion of the rack, arranged to permit assembly thereof after the line shaft and pinion are in position. In certain types of cradles heretofore suggested it has been necessary to mount the portions of the cradle upon the shaft before or at the time the line shaft is erected, and the pinion mounted thereon.

The two parts 10, 11 of the casing may be secured together in any suitable manner, such for example as by bolt and nut connection passing through lugs 17, 17'.

It is to be noted that the lower portion of casing forms a pocket or chamber in which the pinion is housed and encased and serves as a reservoir 13 to hold a lubricant for the pinion as indicated in Figure 1. This is a particularly desirable feature as it insures proper lubrication over a relatively long period of time, thus rendering it unnecessary to give frequent attention to this matter of lubrication. As the cradles are usually located in inaccessible points, this feature is one of considerable practicable advantage.

It is to be understood that if desired the casing might be formed in two parts 10', 11' by dividing it along a plane other than a vertical plane passing through the axis of the shaft. In such an instance the bottom of the chamber encasing the pinion, would be seamless and would thus be well adapted for holding a lubricant without the possibility of leakage. See Figure 5.

Figure 2 shows more clearly the manner in which the casing is maintained upon the hub portion 20 of the pinion. The sides of the casing are of course provided with apertures to receive the line shaft 18, and hub portion of the pinion. The hub portion is provided with a grooved or slotted portion 19 which receives the edge portion of the openings in the side of the casing. The side faces of the pinion serve as guides to limit the sidewise movement of the casings. The portion 20 forming one side of the groove also serves to limit lateral movement of the casing. It is to be noted that the casing is free to rotate relative to the pinion and the shaft so as to adjust itself to the different angular positions assumed by the rack in opening and closing the sash.

Figure 3 shows more clearly the manner in which the window sash 25 is actuated by the rack 16 through the pinion mounted within the casing 10 on the line shaft 18.

A worm gear or wheel 30 in the casing 33 is mounted on the line shaft, said gear being driven by worm 31. The worm carried by the shaft 32 may be actuated from a distant point by any of the well known methods such for example as by the gear wheels 34, and 37 connected by chain 35, or by any other suitable actuating means well known in the art. The worm gear mechanism may be carried by the post 36. A handle 38 may be provided for the wheel 37.

It is understood of course that as many pinions are distributed throughout the length of the line shaft as may be desirable to suit a given length of structure. The pinion is preferably fixed on the line shaft 18 by a set screw 22 in the hub 21 of the pinion.

It is of great advantage to have the worm gear 30 and worm 31 arranged as shown in Figure 3 because the worm serves as a powerful medium for effecting movement of the sash in the first instance, and it also eliminates the necessity for the use of stops and pawl and ratchet mechanism for holding the sash in any given position, inasmuch as the worm itself acts as a brake or stop to prevent accidental movement or closing of the sash, or in the event that the chain should break.

Figure 4 shows more clearly the relative arrangement of a cradle casing 10 mounted on line shaft 18 and guiding a rack bar 16, one end of which is pivoted to a sash 25 which sash is in turn pivoted at the ridge 28. The rack is slightly curved.

It is to be understood that while only one preferred embodiment of the invention has been shown and described for purposes of illustration, various changes and modifications may be made without departing from the spirit and scope of the invention as set forth in the claims.

What I therefore claim and desire to secure by Letters Patent is:

1. In sash operating devices in which a rack bar and pinion are employed, means for maintaining the rack bar in operative engagement with the pinion upon rotation of the pinion, said means comprising a cradle including a two part casing split along a plane permitting assembly of the two parts about the pinion while the pinion is on the line shaft, said parts forming a substantially enclosed chamber, a pair of rollers supported and enclosed within the upper part of the chamber and arranged to engage one edge of the rack bar so as to prevent disengagement of the teeth of the rack bar from the teeth of the pinion, said casing having apertures in opposite ends thereof to receive and guide the rack bar therethrough, whereby said casing completely encloses the pinion and the rollers, and the lower part of the casing chamber serves as a reservoir or pocket to receive a lubricant for the pinion.

2. Sash operating mechanism comprising in combination a sash, a rack bar having one end connected to said sash, a line shaft, a pinion mounted on said shaft and arranged to actuate said rack bar, and a cradle for maintaining the rack bar in engagement with the pinion at all times, said cradle including a two part casing divided in a plane passing through the axis of the pinion for completely encasing the pinion and a portion of the rack bar, and adapted to be assembled about the pinion while in position on the line shaft.

3. In sash operating mechanism including a pinion and a rack bar engaging the pinion, a cradle to maintain the rack bar and pinion in operative relation at all times upon rotation of the pinion, said cradle comprising a two part casing divided in a plane passing througth the axis of the pinion, said casing being adapted to form a chamber arranged to encase the pinion and means including a roller mounted within the casing and adapted to engage one edge of the rack bar to maintain the rack and pinion in cooperative relation.

4. In sash operating mechanism including a pinion and a rack engaging the pinion, a cradle including a roller engaging the edge of the rack, a two part casing having apertures in opposite ends thereof adapted to receive and guide the rack, said casing being formed so that an aperture is in each part of the casing, said pinion having a grooved hub portion on each side of and adjacent to the teeth of the pinion, the sides of said casing being provided with openings forming an annular portion adapted to fit within the said grooves whereby alignment of the casing and rack bar relative to the pinion is effected, said casing also providing an enclosed chamber adapted to house the roller and the pinion and to serve as a reservoir to hold lubricant for the pinion.

5. In sash operating mechanism including a pinion and a rack engaging the pinion, a cradle comprising a casing having apertures on opposite ends thereof adapted to receive the rack, the sides of said apertures serving as guides to limit lateral movement of the rack, said casing also having annular apertures on opposite sides thereof adapted to receive the shaft upon which the pinion is mounted, said casing being formed of two parts split in a vertical plane passing through the axis of the shaft, and securing means for holding said parts in assembled relation whereby said parts of the casing form, when in position upon the shaft, a substantially enclosed chamber to house the pinion and also serve as a reservoir to receive a lubricant for the pinion.

In testimony whereof I affix my signature.

EDWIN W. TERHUNE.